United States Patent [19]
McDonagh

[11] Patent Number: 5,181,518
[45] Date of Patent: Jan. 26, 1993

[54] METHOD OF EVALUATING CARDIOPROTECTIVE AGENTS

[76] Inventor: Paul F. McDonagh, 4830 Camino La Brinca, Tucson, Ariz. 85724

[21] Appl. No.: 650,295

[22] Filed: Feb. 4, 1991

[51] Int. Cl.⁵ .............................................. A61M 1/00
[52] U.S. Cl. .................................... 128/696; 606/194; 128/632; 600/16; 600/17; 600/18; 604/28
[58] Field of Search .................... 128/632, 696; 600/4, 600/16, 18, 17; 604/24, 28, 96–99; 606/194

[56] References Cited

U.S. PATENT DOCUMENTS

| | | | |
|---|---|---|---|
| 4,450,841 | 5/1984 | Osterholm | 128/632 |
| 4,883,459 | 11/1989 | Calderon | 600/4 |
| 5,024,668 | 6/1991 | Peters et al. | 600/18 |
| 5,057,120 | 10/1991 | Farcot | 606/194 |
| 5,059,167 | 10/1991 | Lundquist et al. | 600/16 |

*Primary Examiner*—William E. Kamm
*Assistant Examiner*—George Manuel
*Attorney, Agent, or Firm*—Alvin Isaacs

[57] ABSTRACT

A bioassay and model is disclosed for screening experimental cardioprotective drugs and techniques, which employs small laboratory animal hearts in a model which mimics the pathophysiologic process.

21 Claims, 1 Drawing Sheet

METHOD OF EVALUATING CARDIOPROTECTIVE AGENTS

FIELD OF THE INVENTION

This invention relates to a novel bioassay for screening experimental drugs and techniques designed to protect the heart from injury (or further injury) due to reduced blood flow and reperfusion injury when flow is restored.

BACKGROUND OF THE INVENTION

Although very significant advances have been made in recent years in the treatment of heart disease, diseases of cardiovascular origin still remain the number one killer.

In order to develop effective modes of treatment, one must first understand the cause(s) and mechanisms underlying the disease process. This understanding requires investigative research which in turn requires suitable models that closely mimic the pathophysiology of the disease. These models can be employed to perform experiments to learn the basic mechanisms underlying disease and/or for testing procedures or agents suspected to offer some protection or which may reduce the harmful effects of the disease.

As is of course well recognized, occlusive artery disease and/or intracoronary thrombosis can cause a heart attack by critically reducing the blood supply to the heart muscle (ischemia). If blood flow is not resupplied within a reasonable time, the ischemic tissue is irreversibly injured.

To reperfuse ischemic tissue, physicians may elect to bypass the narrowed vessels or to restore blood flow using angioplasty (balloon procedure) or thrombolysis (dissolve clot). The choice of which procedure to use depends on the nature and severity of the coronary compromise.

In the last few years, it has become clear that early in reperfusion there is a modest extension of damage to the heart. This extension is clearly much less than that which would occur if reperfusion did not take place. Nevertheless, the extension of heart disease is very real and is recognized to the extent that it has become known in the art as "reperfusion injury."

Evidence reported in the literature suggests that activated blood cells play an important role in reperfusion injury. Consequently, researchers in a number of academic and industrial laboratories have been attempting to learn more about how the injury occurs and how to prevent it. Additionally, pharmaceutical companies have exhibited keen interest in the development of an adjunct reagent to accompany thrombolysis treatment to minimize reperfusion injury.

The development of any such adjunct reagent involves several steps including initially testing the pharmaceutical in an appropriate animal model prior to obtaining FDA approval for any clinical studies in humans. The desirable characteristics for an animal model include: (1) it should mimic the pathophysiologic process; (2) it should demonstrate consistent, measurable pathophysiologic effects; and (3) it should be easy to learn, straightforward to apply, not be labor-intensive, and be reasonably inexpensive. Current models do not possess all the desirable characteristics enumerated above for routine use as test systems.

A primary object of this invention, therefore, is to provide a novel test procedure which satisfies the above-mentioned requirements and is accordingly quite suitable for routine evaluation and screening of cardioprotective reagents.

Another object is to provide a test procedure which can clearly demonstrate in a straightforward manner the contribution of blood components to ischemia-reperfusion injury.

A further object is to provide a simple, reliable, cost-efficient experimental model of myocardial ischemia-reperfusion injury that accounts for the contribution of blood components to the compromise of cardiac function.

Still another object is to devise a test procedure and method of the foregoing description which utilizes small laboratory mammals rather than canines or other larger animals.

SUMMARY OF THE INVENTION

In accordance with this invention, these objects are accomplished in an elegant manner by employing a procedure using an isolated heart preparation from a small laboratory mammal, in which procedure (to be detailed hereinafter), the resistance of the coronary circulation to blood flow and the recovery of cardiac pump function during reperfusion can be easily measured. The novel procedures of this invention permits the contribution of blood components to reperfusion injury to be demonstrated as well as permitting screening of potential cardioprotective reagents to determine with greater speed and at lower cost whether beneficial effects are in fact obtained with such reagents.

BRIEF DESCRIPTION OF THE DRAWING

The FIG. is a flow diagram illustrating the novel test procedure of this invention.

DETAILED DESCRIPTION OF THE INVENTION

Figure 1:
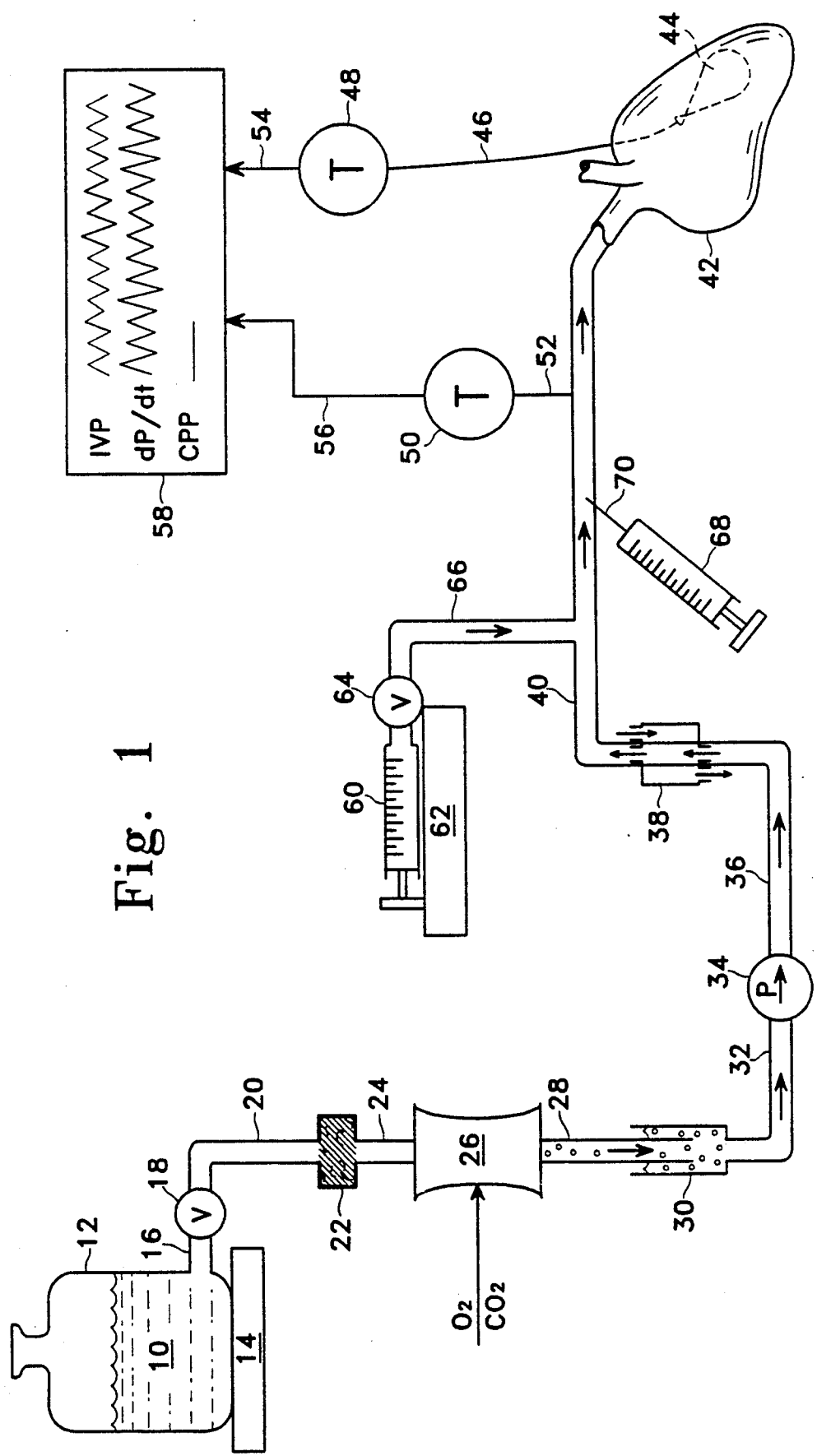

In accordance with the present invention, use is made of hearts from small mammals, e.g. mammals weighing on the order of 400-600 grams, such as laboratory rats. The animals are anesthetized and the hearts perfused and isolated in accordance with the procedures described in "Direct visualization of the Coronary Microcirculation for Pharmacologic and Physiologic Studies", by the Applicant, Paul F. Mcdonagh and others, *Microvascular Research* 28, 180-196 (1984); and in another publication co-authored by Applicant, "Prevention of transcoronary macromolecular leakage after ischemia-reperfusion by the calcium entry blocker nisoldpine. Direct observations in isolated rat hearts.", *Circ. Res.* 58, 127-136, 1986.

As described therein, male, adult, Sprague-Dawley rats (400-600 grams) were anesthetized and a tracheotomy performed. The animal were respirated with a small animal respirator and the chest was opened with a medial sternotomy, the pericardium separated, and the great vessels exposed. The right subclavian artery, right common carotid artery, inominate artery, and the ascending aorta were then gently freed and loose ligatures placed around the vessels. Next, the subclavian artery was ligated and 150 units of heparin injected into the right atrium. A No. 20 Jelco catheter was then inserted into the common carotid artery and advanced toward the heart until the tip extended into the arch of the aorta. The catheter was secured distally with a tie around the common carotid artery and proximally with two more sutures around the innominate artery.

As is further described in the aforementioned publications, the hearts were perfused with a perfusate composition consisting of a modified Krebs solution containing 2 g % albumin (Sigma Fraction V) and washed blood cells to a hematocrit of 20%. The total osmolarity of the perfusate was 300 mosmole and the colloid osmotic pressure was 8 cm of water. In preparing the perfusate, expired human blood cells were "washed" by mixing with 3 vol of either phosphate-buffered saline or normal Krebs solution. The cells were centrifuged at 10,000 rpm for 10 minutes and the supernatant containing platelets and leukocytes was carefully removed by vacuum suction.

The present invention utilizes a perfusate of the foregoing description, i.e. a Krebs, bovine serum albumin and washed red blood cells composition hereinafter referred to simply as "RBC". Preferably, the Krebs solution is modified by the addition of the chelating agent, EDTA, which solution may simply be referred to hereinafter as a "modified Krebs" solution.

In accordance with the present invention the perfusate is pumped at a constant known flow through an extracorporeal coronary circuit, as will be described in detail hereinafter. Coronary perfusion pressure is monitored continuously with a blood pressure transducer of per se known description connected to a chart recorder. At constant flow, changes in perfusion pressure reflect changes in total coronary vascular resistance.

To evaluate cardiac pump function and compliance, an intraventricular balloon-catheter system is employed wherein a balloon fashioned from a finger cot or condom tip and a 6-8 inch length of tubing is filled with saline solution and connected to a second blood pressure transducer. The balloon is inserted into the left ventricle through the mitral valve. The catheter is secured with 5-0 suture and the balloon is filled with the saline solution until the left ventricular end diastolic pressure reads 5-7 mmHg. In order to to so, it has been found that the balloon volume required to develop the desired diastolic pressure will typically be on the order of about 250 ul.

The extracorporeal coronary circuit and methodology of this invention may best be understood by reference to the accompanying illustrative drawing.

As shown therein, a quantity of perfusate 10 is provided in container 12 shown to be seated on a suitable support or stand 14. Preferably, the perfusate is a mixture of red blood cells, Krebs solution and albumin, as heretofore mentioned.

A valve 18 of per se known structure control the flow of the perfusate from container 12 through conduits 16 and 20 to a blood filter 22 to remove any small blood clots which may be contained in the perfusate. A filter having pores no greater than about 15 microns is entirely satisfactory for this purpose.

After removal of any small blood clots in filter 22, the perfusate then passes through conduit 24 to an oxygenator 26 where it is admixed with a mixture of oxygen and carbon dioxide fed into the oxygenator from a source thereof (not shown). As will be well understood, the purpose of the oxygenator is essentially two-fold: (1) to oxygenate the coronary perfusate to maintain normal heart pump function; and (2) to maintain the proper perfusate pH, e.g. at on the order of 7.35 to 7.45. For this purpose, a mixture by volume of on the order of 95% oxygen and 5% carbon dioxide is entirely satisfactory.

From the oxygenator 26 where the perfusate including the red blood cells is admixed with the oxygen/carbon dioxide gas mixture, the perfusate passes via conduit 28 into a per se known bubble trap 30 to remove any gas bubbles which may be entrained therein following the oxygenator step. Bubble trap 30 may be any of those heretofore known and used for removing air from a blood flow and may for example simply be a tube in a syringe barrel.

After leaving the bubble trap 30 the perfusate flows through conduit 32 into pump 34 where it is then propelled by the pump through conduit 36 into a heat exchanger 38 whose purpose is to maintain the perfusate at body temperature, i.e. in the range of 35°-37° C.

From the heat exchanger 38, the perfusate is pumped into the rat or other small animal heart 42 by means of conduit or cannula 40 inserted into the common carotid and extending into the arch of the aorta, as previously mentioned.

As previously mentioned, to evaluate cardiac pump function and compliance, an intraventricular balloon-catheter system is employed. The balloon 44 is inserted into the chamber of the left ventricle through the mitral valve.

A balloon 44 of the type previously discussed is shown to be inserted into the heart, which insertion is into the left ventricle through the mitral valve. Balloon 44 is in turn connected by lead 46 to a first blood pressure transducer 48 for evaluating cardiac pump function. A second transducer 50 for monitoring coronary perfusion pressure is connected to conduit 40 upstream from heart 42 by lead 52. Transducers 48 and 50 communicate with a recorder 58 by means of leads 54 and 56, respectively to record the data transmitted by the transducers. It will be understood that recorders and transducers which may be utilized in the practice of this invention, as well as means for communication between the respective components are well known in the art and accordingly will per se comprise no part of the present invention. Since their selection will be a matter of individual choice or whim within the expected judgement of the skilled worker in the light of the present disclosure, they need not be discussed in any further detail.

A syringe or other container 60 of dilute whole blood perfusate (to be discussed in detail hereinafter) is shown to be situated on stand 62. A valve 64 controls circulation of this perfusate through conduit 66 and then into conduit 40.

A syringe 68 containing a cardioprotective reagent candidate is removably connected through needle 70 to conduit 40 downstream from conduit 66.

The following description illustrates the procedures and protocols utilizing the aforementioned extracorpeal coronary circuit.

Preparation of Perfusate Precursor

To prepare the perfusates used in the practice of this invention, a Krebs solution/albumin precursor may be employed comprising:

|  | mM |
| --- | --- |
| NaCl | 115.00 |
| KCl | 4.70 |
| $CaCl_2$ | 2.50 |

| -continued | |
| --- | --- |
| | mM |
| KH₂PO₄ | 1.20 |
| MgSO₄.7H₂O | 1.20 |
| NaHCO₃ | 25.00 |
| CaNa₂ EDTA* | 0.08 |
| Albumin | 2 g/100 ml |

*EDTA = Ethylenediamine tetraacetic acid

Preparation of Red Blood Cell Perfusate ("RBC")

Expired red blood cells may be mixed with 3 vol of either phosphate-buffered saline (PBS) or normal Krebs solution. The cells are then centrifuged at 10,000 rpm for 10 minutes and the supernatant carefully removed by vacuum suction. This washing step is performed twice with the PBS one once with Krebs. The thus washed cells may then be mixed with the Krebs/albumin perfusate precursor solution described above to a hematocrit of 20%, i.e. in a ratio by volume of solution: cells of on the order of 4:1.

Preparation of Diluted Whole Blood Perfusate ("DWB")

A trach tube is inserted into an anesthetized large rat which is then placed on a ventilator. Respirate with 95% oxygen-5% carbon dioxide for a few minutes and then draw 10-13 cc of blood into a 30 cc heparinized syringe by cardiac puncture. As will be well understood by those skilled in the art, whereas clotting of the RBC perfusate is prevented by the washing, heparin is required in the DWB perfusate to prevent clotting. As will be further understood by those skilled in the art, too much heparin will tend to inhibit leukocyte function. The selection of the appropriate range of heparin will accordingly involve mere routine experimentation for a particular perfusate, which selection will be within the expected judgment of the skilled worker. Optimally, Applicant has found the final heparin concentration to be on the order of 10 units/ml of DWB. The heparinized whole blood is then diluted at a ratio of 1:1 with the above-mentioned modified Krebs solution. In this manner the hematocrit, total protein concentration and blood gas values of the DWB will be similar to the RBC solution described above. Accordingly, when DWB perfusion is substituted for the RBC perfusion, the oxygen delivery and hemodynamic parameters need not be altered.

Heart Preparation

Prior to removal of the heart from the animal, cannula 40 is inserted through the common carotid into the arch of the aorta. The RBC perfusate is pumped through the extracorpeal coronary circuit, as described above, and the heart is then isolated while continuing pumping the perfusate. After the heart has been isolated, the balloon is inserted in the left ventricle through the mitral valve and the cannula 40 secured, e.g. with 5-0 suture.

In the procedure described above and shown in the illustrative drawing, it will be seen that the perfusate is not recirculated back, i.e. purified and returned to container 12. Instead it is permitted to drain into a suitable pan or the like beneath heart 42. However, it is within the scope of this invention to provide recirculation means, if found desirable or expedient to do so. Preferably, a single-pass system is utilized for this purpose.

Monitoring Cardiac Function

In accordance with this invention, intraventricular systolic and diastolic balloon pressures are measured continuously during the experimental protocol to assess cardiac function. The balloon is initially filled in small increments, e.g. 25-50 ul until the left ventricular end diastolic pressure reads 5-7 mmHg. The balloon volume required to develop the desired diastolic pressure for the small animal hearts employed was found to be on the order of about 250 ul.

With this system, measurements are made of left ventricular end systolic pressure (LVSP), left ventricular end diastolic pressure (LVDP), and the derivative of ventricular pressure (dP/dt). At constant balloon volume and constant heart rate (hearts are paced at 250 beats/minute), +dP/dt is a direct measure of myocardial contractility and −dP/dt is a direct measure of cardiac relaxation. To measure cardiac compliance, the heart is briefly arrested with a high potassium infusion. Arrested heart pressure volume curves are obtained before and after ischemia by adding 20 ul incremental volumes to the balloon while monitoring pressure.

Protocols

The above-described extracorpeal coronary circuit together with the RBC and DWB perfusates may be utilized to: (1) quantitatively measure the effects, if any, of a reagent or protocol for its use on the coronary vascular resistance to blood flow (coronary resistance) and cardiac pump function; and (2) determine if a cardioprotective reagent effects or in any way alters the contribution of blood components to ischemia-reperfusion injury as measured by changes in coronary resistance and cardiac pump function.

In each such test procedure, blood gas, white blood cell count, hematocrit and platelet counts should ideally be made of each of the perfusates employed. The cell counts of the DWB perfusate should be ½ normal values because of the Krebs solution/albumin dilution of the blood in the perfusate.

The following experimental protocol is illustrative of a postischemia DWB perfusion assay in accordance with the practice of this invention.

1. Set up a perfusion circuit (as heretofore described) with RBC perfusate.

2. Anesthetize donor animal, perform surgery, connect coronary perfusion circuit, and isolate (remove) the heart.

3. Arrest heart, insert balloon and obtain preischemia compliance curve.

4. Allow heart to beat again, pace heart at 250 beats/minute and obtain preischemia ventricular function curves and dP/dt data.

5. Begin ischemia by stopping perfusion pump, keep heart warm during ischemia with bath and heat lamp.

6. If a reagent is being screened, begin infusion of the reagent 2-3 minutes before reperfusion is commenced.

7. After 30 minutes of ischemia, begin infusion of DWB at same flow rate as RBC.

8. After about five minutes, discontinue perfusion of DWB and continue reperfusion only with RBC.

9. After 10 minutes of reperfusion, attempt to pace hearts.

10. Monitor ventricular pressures for 35 minutes of reperfusion.

11. Arrest heart and perform post-ischemia compliance curve.

12. Stop experiment, obtain heart weight and process for cardiac water and/or histology, if desired.

As was heretofore mentioned, the present invention is primarily directed to a novel system utilizing a small laboratory mammal heart for screening potential cardioprotective agents, which system is characterized as being demonstrable in a straightforward quantitative manner, simple, reliable, cost-effective, and relatively rapid.

In order to screen reagents useful in minimizing myocardial ischemia-reperfusion injury, it is first extremely important to understand the measurable effect whole blood plays on reperfusion injury. To fully appreciate this measurable effect it is in turn important to understand and to quantify the effect (if indeed there is an effect) that leukocytes in whole blood have on reperfusion injury as compared with the reperfusion injury resulting when only a "washed" red blood cell perfusate circulates to the heart.

The following examples show by way of illustration and not by way of limitation this aspect of the present invention.

EXAMPLE I

Effect of Ischemia/Reperfusion on Ventricular Function Using Red Blood Cell Perfusate Using the extracorporeal coronary circuit shown in the illustrative drawing and heretofore described in detail, with the pump set to circulate the RBP perfusate at a constant rate of 3 ml/minute/gm of heart weight, the heart pump function was determined by relaying the systolic and diastolic pressure readings from heart 42 to transducer 48 where they are in turn recorded on recorder 58. After being subjected to 30 minutes of global (total) no-flow ischemia, reperfusion is instituted at the same flow rate and after about fifteen minutes the pressure readings again recorder. Readings are also taken after 25 and 35 minutes of reperfusion. Comparison of the preischemic ventricular function with that after ischemia and reperfusion indicated that the heart had recovered about half of its preischemic ventricular function during reperfusion. Additionally, an increase in vascular resistance to blood flow was observed. The summary results of a group of hearts subjected to this protocol are recited in the Table in Example II as Group II.

EXAMPLE II

Effect of DWB Perfusion on Recovery After Ischemia

In this example, coronary vascular resistance, ventricular function and cardiac compliance were evaluated before and after ischemia. Four groups of studies were conducted, each utilizing a number of rat hearts for the sake of accuracy. Group I was a non-ischemic time control group, i.e. a control study where no ischemia was instituted. Group II was subjected to 30 minutes of global, no-flow ischemia followed by reperfusion. Group III was subjected to ischemia, as was Group II, except they were perfused with DWB perfusate for five minutes immediately before ischemia. Group IV was similar to Group III, except that they were perfused with DWB during the first five minutes of reperfusion rather than before ischemia. For each group, the following quantitative measures were taken: (a) coronary resistance, as measured by dividing the perfusion pressure (mmHg) recorded by transducer 50 by the rate of flow from the calibrated pump 34; (b) the heart contractility (+dP/dt); (c) heart relaxation (−dP/dt); (d) ventricular function (LVSP minus LVDP; and (e) cardiac compliance or measure of stiffness of heart (contracture Index).

These results are set forth in the following Table, wherein the data in indicate the recovery from ischemia for each parameter. The recovery for each heart was calculated as the parameter value after 35 minutes of reperfusion divided by its respective pre-ischemia value. The data is summarized as the mean values.

Effects of Ischemia-Reperfusion with and without Diluted Whole Blood on Coronary Vascular Resistance and Recovery of Pump Function.

| Group | n | Intervention | Coronary Resistance | +dP/dt | −dP/dt | LVSP − LVDP | Contracture Index |
|---|---|---|---|---|---|---|---|
| I | 7 | None (Control) | 101 ± 3 | 93 ± 6 | 91 ± 6 | 91 ± 4 | 0.95 ± 0.04 |
| II | 11 | Ischemia-Reperfusion (I/R) | 130 ± 7 | 56 ± 12 | 63 ± 14 | 63 ± 13 | 1.78 ± 0.15 |
| III | 7 | I/R - DWB pre | 152 ± 14 | 39 ± 15 | 42 ± 13 | 36 ± 11 | 1.71 ± 0.16 |
| IV | 7 | I/R - DWB post | 139 ± 12 | 19 ± 6 | 22 ± 7 | 23 ± 7 | 2.31 ± 0.28 |

As seen from the above data, the present invention provides an improved procedure compared to existing models because the DWB provides the researcher with the ability to note and to assess the additional ischemic damage caused by the presence of formed blood elements, which information will assist in research to inhibit or to obviate this damage caused by the presence of the formed blood elements.

From the data in the Table, it will be apparent that when DWB is used as the perfusate for the first five minutes during reperfusion, the recovery of the cardiac pump function is markedly depressed. It will further be noted that DWB perfusion either before or after ischemia leads to an increase in coronary resistance during reperfusion. This response in vivo would reduce coronary blood flow. Perfusion with DWB before ischemia aggravates recovery but not to the extent observed when DWB was perfused during the early reperfusion period.

In view of the foregoing discussion, it will then be appreciated that the present invention provides an excellent system for evaluating pharmacological reagents designed to reduce reperfusion injury.

The following example illustrates the process of this invention in screening and evaluating cardioprotective reagents.

EXAMPLE III

Evaluation of ATP-MgCl$_2$ as a Cardioprotective Reagent

To screen the above-mentioned cardioprotective reagent candidate for effect, the aforementioned experimental protocol for post-ischemia DWB perfusion was utilized. Administration of the ATP-MgCl$_2$ after ischemia was observed to provide a modest (slight) enhancement of recovery.

Because the oxygen delivery is more physiologic with RBC than with an asanguinous perfusate such as Krebs, the hearts will have significantly greater coronary vascular tone. Accordingly, coronary vascular responses to reagents such as vasoactive reagents for causing vascular dilation will be more realistic due to the fact they are more likely to mimic in vivo responses. Moreover, since the developed ventricular pressures are closer to in vivo conditions and, moreover, since the heart preparation perfused with the RBC perfusate is stable for a longer period of time than a heart perfused with Krebs solution, the model can be used as a sensitive indicator of the inotropic effects of any reagent or intervention.

Accordingly, the present invention is also particularly useful in assessing the vasodilator action of cardiovascular drugs such as calcium entry blockers.

By way of recapitulation, the present invention provides a mammalian isolated heart model of ischemia-reperfusion injury in which the coronary resistance and ventricular function are easily determined and in which preischemic control parameters are closer to in vivo values when compared to asanguinous perfusates. It utilizes a DWB perfusate that can be rapidly and freshly prepared and which can be used in combination with the above-described model to demonstrate the contribution of blood components to ischemia-reperfusion injury.

From what has been described, it will thus be seen that the present invention provides a unique and improved system for evaluating cardiovascular compounds or other interventions believed to reduce ischemia-reperfusion injury.

From the foregoing description, it will thus be seen that the present invention provides an elegant model and bioassay tool for evaluating experimental drugs and techniques designed to protect the heart from injury due to reduced blood flow and reperfusion injury when flow is restored.

Since certain changes may be made without departing from the scope and spirit of the invention herein contemplated, it is intended that all matter in the foregoing description, including the Drawing and Examples shall be taken as illustrative and not in a limiting sense.

What is claimed is:

1. A bioassay model adapted for use with an isolated mammalian heart which mimics the human pathophysiologic process in order to screen experimental drugs and techniques for protection from ischemia-reperfusion injury comprising an extracorpeal coronary circuit comprising
   (1) means for associating the mammalian heart with the model;
   (2) a source of a first perfusate;
   (3) a source of a second perfusate comprising whole blood;
   (4) conduit means adapted for perfusing the first and second perfusates to the associated heart;
   (5) means for determining and evaluating cardiac pump function comprising an inflatable balloon adapted for insertion within the left ventricle of the associated heart through the mitral valve and first transducer means communicating with the balloon by a first lead for monitoring cardiac pump action as a function of pressure within the balloon; and
   (6) means for determining and evaluating coronary perfusion pressure comprising second transducer means communicating by a second lead with the conduit means for perfusing the first and second perfusate.

2. A bioassay model as defined in claim 1 wherein the hematocrit of red blood cells in the first perfusate is about 20 percent.

3. A bioassay model as defined in claim 2 wherein the whole blood in the second perfusate is heparinized whereby to prevent coagulation.

4. A bioassay model as defined in claim 3 wherein the hematocrit, total protein concentration and blood gas values of the red blood cells in the first perfusate and the whole blood in the second perfusate are substantially the same.

5. A bioassay model as defined in claim 1 further comprising filter means for removing any small blood clots from the red blood cells in the first perfusate.

6. A bioassay model as defined in claim 1 further comprising means for introducing an oxygen/carbon dioxide mixture into the first perfusate perfusing to the associated mammalian heart to maintain proper heart function and to maintain the proper perfusate pH of from about 7.35 to 7.45.

7. A bioassay model as defined in claim 6 further comprising means for removing bubbles which may be entrained in the first perfusate after introducing the oxygen/carbon dioxide mixture into the first perfusate.

8. A bioassay method as defined in claim 1 including the step of introducing a test cardioprotective reagent candidate to test the reagent's effectiveness to reduce or prevent the blood's contribution to ischemia-reperfusion injury.

9. A bioassay model as defined in claim 1 wherein the first perfusate contains washed red blood cells.

10. A bioassay model as defined in claim 1 including conduit means for circulating a drug candidate to the associated heart for screening.

11. A bioassay model as defined in claim 1 wherein the first and second transducer means each communicate with recorder means for recording data transmitted by each of the transducer means.

12. A bioassay method for determining reperfusion/ischemia injury comprising the steps of:
   (1) perfusing a first perfusate containing red blood cells through a coronary perfusion circuit to an isolated mammalian heart;
   (2) obtaining cardiac pump function and coronary perfusion pressure data while perfusing the first perfusate;
   (3) stopping perfusion for a predetermined period of time to cause ischemia;
   (4) perfusing a second perfusate containing whole blood through the coronary perfusion circuit for a predetermined period of time either prior to or immediately after ischemia;
   (5) immediately after the predetermined period of time of ischemia commencing reperfusion of the first perfusate;
   (6) monitoring cardiac pump function during reperfusion obtaining cardiac pump function and coronary perfusion data during reperfusion; and
   (7) comparing the preischemia and the reperfusion data, whereby to determine the extent of reperfusion injury.

13. A method as defined in claim 12 including the step of infusing a cardioprotective reagent candidate for screening of effectiveness in minimizing or inhibiting ischemia-reperfusion injury before commencing reperfusion.

14. A method as defined in claim 12 wherein the second perfusate is perfused after ischemia.

15. A method as defined in claim 12 wherein each of the perfusates further comprises a Krebs/albumin solution.

16. A method as defined in claim 12 wherein the hematocrit of the whole blood, total protein concentration and blood gas values of the first perfusate and the second perfusate are substantially the same.

17. A bioassay method as defined in claim 12 wherein the time period of ischemia is on the order of thirty minutes.

18. A bioassay method as defined in claim 12 wherein the data obtained following ischemia is obtained after a period of at least fifteen minutes of reperfusion.

19. A bioassay method for determining reperfusion injury comprising the steps of:
  (1) providing a bioassay model comprising an extracorpeal coronary circuit including an animal heart which mimics the human pathophysiologic process in order to screen experimental drugs and techniques for protection from ischemia-reperfusion injury;
  (2) circulating through the circuit to the animal heart in the model a first perfusate maintaining normal cardiac pump function;
  (3) determining the ventricular function of the heart while the perfusate is circulating through the bioassay model;
  (4) stopping circulation of the perfusate whereby to cause ischemia;
  (5) replacing the first perfusate with a second perfusate comprising a solution containing whole blood either just prior to or after the period of ischemia;
  (6) after a predetermined period of ischemia, reperfusing the perfusate to the heart; and
  (7) during reperfusion determining the ventricular function of the heart, whereby to obtain a comparison of postischemic to preischemic ventricular function.

20. A bioassay method as defined in claim 19 wherein the circulating perfusate maintains normal cardiac pump function and the perfusate is replaced by a solution containing whole blood either just prior to or after the period of ischemia whereby to determine the contribution of blood elements to ischemia-reperfusion injury.

21. A bioassay method as defined in claim 19 including the step of introducing a test cardioprotective reagent candidate to test the reagent's effectiveness to reduce or prevent the blood's contribution to ischemia-reperfusion injury.

* * * * *